Figure 1:
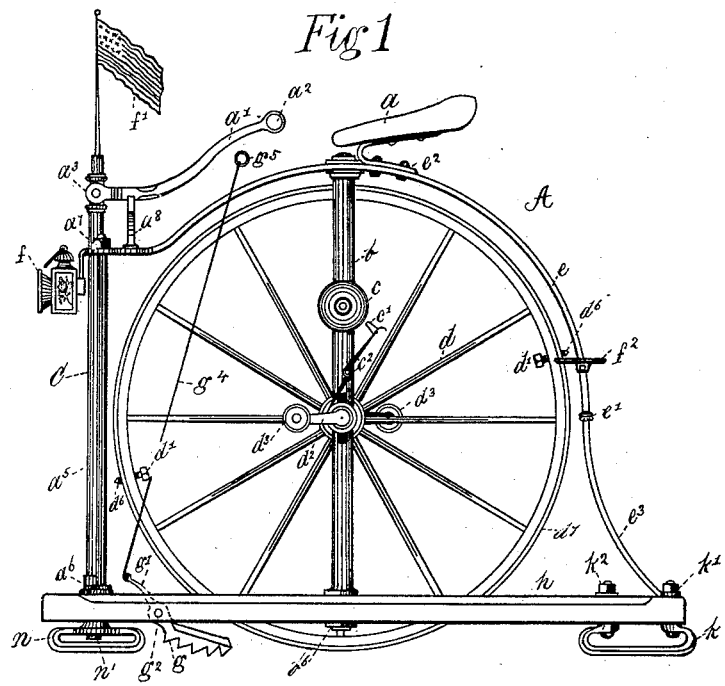

(No Model.) 2 Sheets—Sheet 1.

C. SANDFORD & P. S. KINNE.
VELOCIPEDE.

No. 303,753. Patented Aug. 19, 1884.

Witnesses
Richard A. Healy
Kittie Inglis

Inventor
Charles Sandford
Porter S. Kinne
John Inglis atty (No Model.) 2 Sheets—Sheet 2.

C. SANDFORD & P. S. KINNE.
VELOCIPEDE.

No. 303,753. Patented Aug. 19, 1884.

Witnesses
Richard W. Henly
Kittie Inglis

Inventor
Charles Sandford
Porter S. Kinne
John Inglis atty

UNITED STATES PATENT OFFICE.

CHARLES SANDFORD AND PORTER S. KINNE, OF PATERSON, N. J.

VELOCIPEDE.

SPECIFICATION forming part of Letters Patent No. 303,753, dated August 19, 1884.

Application filed July 8, 1884. (No model.)

*To all whom it may concern:*

Be it known that we, CHARLES SANDFORD and PORTER S. KINNE, citizens of the United States, residing at Paterson, Passaic county, State of New Jersey, have invented a new and useful Improvement in Velocipedes, of which the following is a specification, reference being had to the accompanying drawings, forming a part thereof.

The object of our invention is the production of a velocipede for ice.

The invention consists in various devices, illustrated in the drawings, which will be hereinafter fully explained, and pointed out in the claims.

Figure 2:
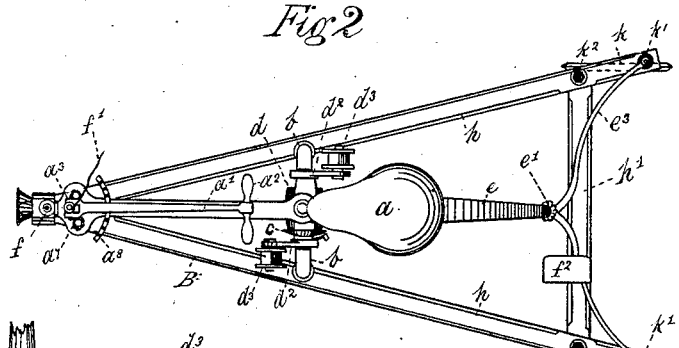
Figure 3:
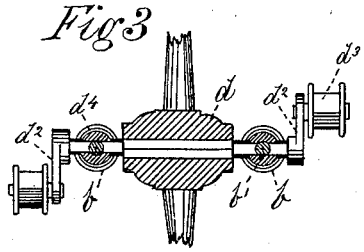
Figure 4:
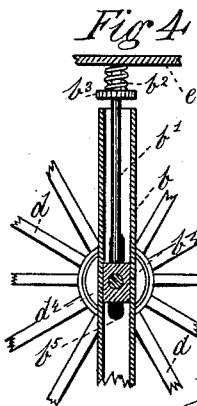
Figure 5:
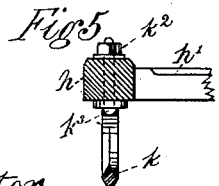
Figure 6:
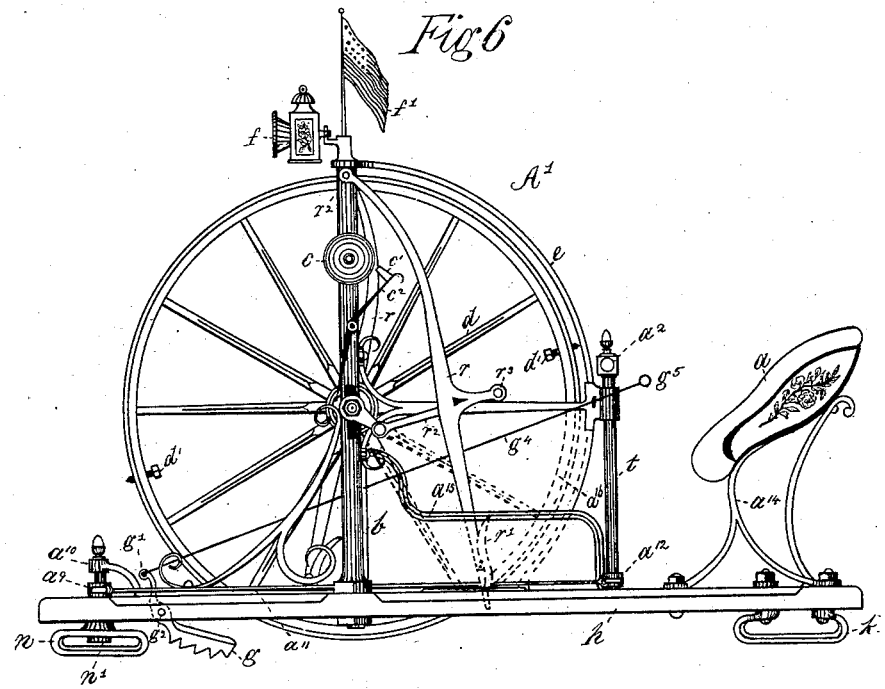
Figure 7:
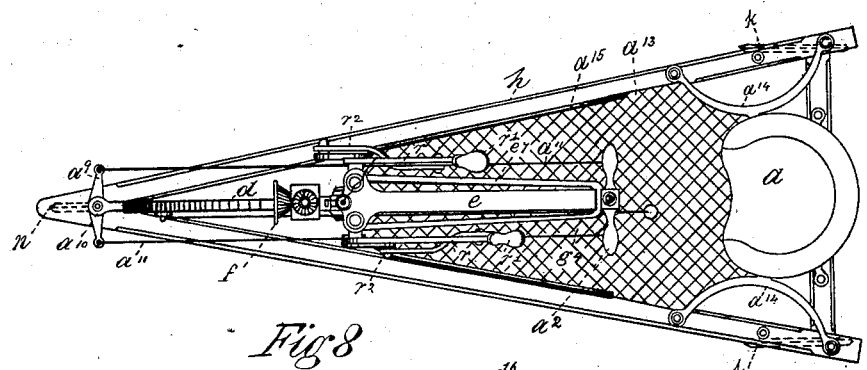
Figure 8:
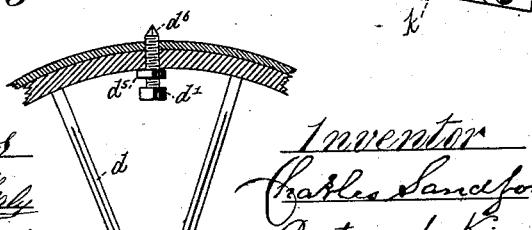

Figure 1 of the drawings shows our invention in elevation. Fig. 2 is a plan of the same. Fig. 3 is a part-sectional plan of the wheel, standards, &c. Fig. 4 is a vertical sectional elevation of standards, &c., detached. Fig. 5 is a sectional elevation of runners. Figs. 6 and 7 are modifications of that shown in the other figures, and Fig. 8 is a section of wheel and pin.

A represents a velocipede for ice, constructed and having a frame, B, which frame is made with a pointed front, and is made so by cutting away the inner sides of the side pieces, $h$, at a suitable angle to give the required spread to the back part of the frame to support and balance the devices in their perpendicular position, and is held in such spread position by a transverse bar, $h'$.

Suitably arranged on the sides $h$ of the frame B are standards $b$, which standards are hollow, and have bolts suitably arranged in the bottom of the same to accommodate screw-nuts $b^6$, by which they are secured to the frame. The standards where they jam on the sides $h$ have enlargements or flanges, to give ample bearing on the frame to support said standards when they are brought jam thereon by the jam-nuts $b^6$. On the front part of the frame B there is arranged and suitably secured a like standard, C. Under the back part of the frame B there are arranged and secured to sides $h$, by bolts $k'\ k^2$, runners $k$. The runners $k$ are formed of square steel, and are set on the angle so as to present the corner to the ice, and have curved turned-up ends with eyes formed therein, to accommodate the bolts by which they are secured to the frame. The runner $n$, which is adjustably secured to the front part of the frame by a pivot-rod arranged in the hollow of the standard C, also presents its angle or corner to the ice like runners $k$, and is used as a guide-runner. The standards $b$ are provided with slots $b^5$, in which slots there are arranged adjustable bearings $b^4$. Into said bearings $b^4$ there is journaled a wheel, $d$. The wheel $d$ is provided with the usual hub and spokes, and has arranged in its rim $d^7$ screw-pins $d'$, having a plate, $d^5$, and angle-points $d^6$, as shown in Fig. 8, that project beyond the outer circumference of the wheel $d$ to engage the ice. The wheel-shaft has arranged and secured on each end of the same crank-arms $d^2$. The outer end of arms $d^2$ are provided with a stud, on which there are arranged treadle-wheels $d^3$. The brace $e$, which is bifurcated at the junction $e'$, spreads apart. Its divided parts $e^3$ are secured to the back of the frame B by bolts $k'$. The brace or guard $e$ has adjustably arranged and secured thereon a step, $f^2$, and a seat $a$. The seat $a$ is suitably secured to an iron strap, and is secured by means of said strap to the guard $e$ by bolts $e^2$. The plate $b^3$, which is transversely arranged under the brace $e$, is secured at each of its ends to a vertical rod, $b'$, which rods are secured at their lower ends in the adjustable bearings $b^4$ in the hollow of the standards $b$, as shown in Fig. 4. The plate $b^3$ is provided centrally with a pin, on which pin is arranged a helical spring, $b^2$, the pin passing up through the brace $e$. The front end of the brace $e$ has an enlarged surface, in which are arranged the upper ends of supporting-rods $a^5$, to which the brace or guard $e$ is secured by means of screw-nuts $a^7$, the tops of the rods $a^5$ having corresponding threads to accommodate jam-nuts $a^7$ in securing the brace $e$ jam on the rods $a^5$ and standard C. In front of the standard C and secured to a depending part of the brace $e$ there is a head-light, $f$. The pivot-rod $n'$, that is arranged in the hollow of the standard C, is secured by a knuckle-joint to the outer end of a guide-lever, $a'$, which lever is provided with a handle, $a^2$.

Suitably secured to the brace $e$ and under the lever $a'$ there is a curved plate having notches $a^8$. On the standard $b$ there is arranged and suitably secured a gong, $c$, and on a pin secured in said standard a hammer, $c'$, and spring $c^2$, and in the hub of the wheel $d$ a pin to engage said spring $c^2$. To the frame B there is adjustably secured on a pivot-stud, $g^3$, a serrated brake, $g$. The upper end of part $g'$ is adjustably secured to a brake-rod, $g^4$, having a ring, $g^5$.

Operation: The rider mounts the velocipede A by placing his foot on the step $f^2$, and takes his seat on the seat $a$, after which action he places his feet in the treadle-wheels $d^3$, and after starting the wheel in the usual way the wheel $d$ is kept in rotation by means of the alternate up-and-down movement of the legs and feet of the rider. The rotation of the wheel $d$ in the manner stated brings the angle-points $d^6$ of the pins $d'$ into engagement with the ice at intervals, which will be more or less frequent in perfect accordance with the speed of the wheel $d$. The pins $d'$, owing to their sharp angular points and the weight to which they are subjected, insert their points $d^6$ into the ice in their engagement therewith, which action tends to give increased velocity of motion to the velocipede between their intervals of engagement with the ice. The runners $k$, which are set in line with the runner $n$, glide smoothly over the ice, and are kept from lateral motion by their sharp or angular edges. The runner $n$ is held rigidly in line by the guide-bar $a'$ in the notch $a^8$. The pin arranged in hub of the wheel $d$ (not shown) engages the spring $c^2$ at each revolution of the wheel and forces the hammer $e'$ into engagement with the gong $c$, producing cautionary sounds thereby, and indications of its approach by such sounds to interfering objects. In case objects are discovered to be in the way which makes it necessary to stop the velocipede or change its course to escape such objects, the rider will raise the brake-rod $g^4$ and force the serrated brake $g$ into engagement with the ice, and thereby stop the velocipede or raise the guide lever or bar $a'$ out of its straight-line notch by means of the handle $a^2$, and turn the lever $a'$ to the right or left, as the case may be, into another notch, $a^8$, which action, by means of the pivot-rod $n'$, will change the line of the guide-runner $n$ and the course of the velocipede to escape such interfering objects. When the velocipede is used at night, the head-light $f$ is brought into requisition to discover interfering objects. The flag $f'$ will turn in its socket to suit the course of the velocipede. Should the velocipede pass over protuberances or ice having an uneven surface, the effect of the velocipede passing such uneven surface will be met by the adjustable bearings $b^4$, which will yield in their slots while the spring $b^2$ will compress and distend, which will prevent shock or jar of the devices. When the velocipede is used in the modified form shown in Figs. 6 and 7, the frame is lengthened and the seat secured to the back of the frame by a brace, $a^{14}$. The flag and head-light are secured to standard $b$, the brake-rod arranged to a standard, $t$, the guide-bar is attached to rods $n''$, and the crank-arms connect with a link, and are operated by treadle-bars having shoes $r'$, by a come-and-go motion of the feet, guards $a^{15}$ are arranged at the sides, and a shield, $a^{16}$, secured back of the wheel, and the frame covered by a floor, $a^{13}$.

The wheel $d$ may have one or more pins, $a'$, as experience shall prove most practical.

Having described our invention and its operation, what we claim, and desire to secure by Letters Patent in a velocipede for ice, is—

1. The combination of the frame B, having sides $h$, and transverse bar $h''$, and runners $k$, secured to said frame by bolts $k'$ $k^2$, and standards $b$, secured to the frame by bolts $b^6$, and standard C, secured to the front of said frame B, and runner $n$, secured adjustably to said frame by pivot-rod $n'$, substantially as described.

2. In a velocipede for ice, the combination, with the standards $b$, secured to frame B by bolts $b^6$, of the wheel $d$, with adjustable bearings $b^4$, for journaling said wheel, the bearings arranged in a slot, $b^5$, and slot $b^5$, for guiding said bearings, and rods $b'$, arranged in said bearings $b^4$, with the plate $b^3$, secured to the rods $b'$, the plate having a pin centrally thereon, and spring $b^2$, arranged on said pin, substantially as described.

3. The combination, with the guide-runner $n$ and its rod $n'$, of the standard C, for supporting said rod $n'$, and frame B, for supporting said standard C, and supporting-rods $a^5$, secured in said standard, and brace $e$, secured on said rods and standard by nuts $a^7$, with curved plate having notches $a^8$, secured to said brace, with head-light $f$ and guide-bar $a'$, for guiding said runner $n$, the guide-bar secured to said rod $n'$ by a knuckle-joint, $a^3$, and flag $f'$, with its socket, and seat $a$, secured to the brace $e$, and step $f^2$, secured to said brace, with bolts $k'$, for securing said brace to the frame B, substantially as described.

4. The combination, with the standard $b$, secured to the frame by bolts $b^6$, and wheel $d$, having pins $d'$ with angular points $d^6$, of the treadles $d^3$, for rotating said wheel, the treadles secured to the wheel by crank-arms $d^2$, and crank-arms for securing said treadles to the wheel, with gong $c$, secured to the standard, and hammer $c'$, for engaging the gong, and spring for actuating the hammer, and pin for engaging the spring, and brake $g$, for stopping the velocipede, with rod $g^4$, substantially as described.

CHARLES SANDFORD.
PORTER S. KINNE.

Witnesses:
RICHARD A. HEALY,
JOHN INGLIS.